US006072943A

United States Patent [19]

Gasparik et al.

[11] Patent Number: 6,072,943

[45] Date of Patent: Jun. 6, 2000

[54] INTEGRATED BUS CONTROLLER AND TERMINATING CHIP

[75] Inventors: Frank Gasparik, Monument; John B. Lohmeyer, Colorado Springs, both of Colo.

[73] Assignee: LSI Logic Corporation, Milpitas, Calif.

[21] Appl. No.: 09/001,094

[22] Filed: Dec. 30, 1997

[51] Int. Cl.[7] .......... G06F 15/60

[52] U.S. Cl. .......... 395/500.03; 326/86

[58] Field of Search .......... 395/500.05, 500.18, 395/500.03

[56] References Cited

U.S. PATENT DOCUMENTS 5,539,306 7/1996 Riggio .......... 395/500.18

5,727,231 3/1998 Bartley .......... 395/500.05

*Primary Examiner*—Paul R. Lintz

*Assistant Examiner*—Thuan Do

[57] ABSTRACT

An integrated circuit chip controls a bus and terminates at least one differential data line of the bus wherein the at least one differential data line includes a first bus line of the bus and a second bus line of the bus. The integrated circuit chip includes a package and a substrate. The package includes terminals that are configured to couple the package to the bus. A first terminal is configured to couple the package to the first bus line, and a second terminal is configured to couple the package to the second bus line. The substrate is supported by the package. Furthermore, the substrate includes a bus controller circuit coupled to the terminals and a terminating circuit coupled to the first terminal and the second terminal. The bus controller circuit is configured to control transfer of data on the bus, and the terminating circuit is configured to substantially match a characteristic impedance of the at least one differential data line.

15 Claims, 7 Drawing Sheets

700
710
712
720
722
724

INTEGRATED BUS CONTROLLER AND TERMINATING CHIP

BACKGROUND OF THE INVENTION

The present invention relates generally to bus controllers, and more particularly to a single integrated circuit chip for controlling and terminating a bus. A computer bus is generally a set of parallel conductors connecting two or more electrical devices for the purpose of data transfer. One popular bus is the SCSI bus. The SCSI bus is an interface designed for computers and electronic instrumentation to allow communication of data over short distances. The SCSI bus is designed to connect independent devices such as disk drives, tape drives, file servers, video monitors, printers, scanners, and other computers. Several SCSI versions have been developed and standardized, with newer versions being developed to keep pace with changing computer speeds and requirements. One of the newer standards is low voltage differential (LVD) SCSI, an improved version of differential SCSI. Differential voltage signals (typically of 400 millivolts difference) are used in LVD SCSI, allowing for higher data transfer rates and longer distances than the older single-ended SCSI standard. In LVD SCSI, each differential data line of the SCSI bus is comprised of two separate bus lines. A binary one is transmitted when the first bus line is more positive than the second bus line, and a binary zero is transmitted when the second bus line is more positive than the first bus line.

SCSI devices are usually connected from one device to another in a daisy chain arrangement. This configuration gives rise to a transmission delay problem where the ends of the bus, not having the same characteristic impedance as the bus itself, will reflect a portion of the signal. This reflection will cause longer transmission times as the bus attempts to receive the data signal over the reflected signal. To lessen this reflection problem, the common practice is to terminate each end of the physical SCSI bus with a termination circuit or terminator that attempts to match the characteristic impedance of the SCSI cable. The terminators used in LVD SCSI commonly provide a fixed biasing voltage across the two bus lines to keep the receivers from being driven by noise in the absence of any differential signals.

Unfortunately, due to the fixed biasing voltage the prior art LVD terminators had several drawbacks. One such drawback was that variations in components used to implement the LVD terminators caused the LVD terminators to impress biasing voltages of slightly different magnitudes upon the ends of the differential data lines. This mismatch in biasing voltages generated loop currents through the differential data lines during idle periods on the SCSI bus. These loop currents if severe enough caused differential voltages on the differential data line that receivers misinterpreted as data. Accordingly, prior art LVD terminators were manufactured such that the LVD terminators had highly matched components that provided the ends of the differential data lines with highly matched biasing voltages in order to reduce loop currents. This matching of components in the prior art LVD required costly manufacturing processes such as laser trimming of thin film resistors.

As a result of this costly processing, the prior art LVD terminators could not be integrated into a bus controller circuit without substantial costs. Since, each LVD SCSI device has a bus controller circuit which controls the transfer of data on the SCSI bus, integrating a LVD terminator into the bus controller circuit would provide each device with termination capabilities. Even though only the ends of the SCSI bus need to be terminated, if each SCSI device has termination capabilities, then the SCSI bus can be easily reconfigured for proper termination after a SCSI device has been added to or removed from an end of the SCSI bus. For example, a user may simply activate switches on the SCSI devices which enable or disable the terminators accordingly. Alternatively, each SCSI device may contain circuitry that determines whether the SCSI device is at an end of the SCSI bus and automatically enables or disables the terminators accordingly.

Therefore, what is needed is a cost effective method and apparatus for integrating termination into a bus controller circuit in order to provide each SCSI device with termination capabilities.

SUMMARY OF THE INVENTION

In accordance with one embodiment of the present invention, there is provided an integrated circuit chip for controlling a bus and terminating at least one bus line of the bus. The integrated circuit chip includes an integrated circuit package and an integrated circuit substrate. The package includes terminals for connecting the package to the bus. The substrate is supported by the package. Furthermore, the substrate includes a bus controller circuit coupled to the terminals and a terminating circuit coupled to the at least one bus line of the bus. The bus controller circuit is configured to control transfer of data on the bus, and the terminating circuit is configured to substantially match a characteristic impedance of the at least one bus line.

Pursuant to another embodiment of the present invention, there is provided an integrated circuit chip for controlling a bus and terminating at least one differential data line of the bus wherein the at least one differential data line includes a first bus line of the bus and a second bus line of the bus. The integrated circuit chip includes an integrated circuit package and an integrated circuit substrate. The package includes terminals that are configured to couple the package to the bus. A first terminal is configured to couple the package to the first bus line, and a second terminal is configured to couple the package to the second bus line. The substrate is supported by the package. Furthermore, the substrate includes a bus controller circuit coupled to the terminals and a terminating circuit coupled to the first terminal and the second terminal. The bus controller circuit is configured to control transfer of data on the bus, and the terminating circuit is configured to substantially match a characteristic impedance of the at least one differential data line.

It is an object of the present invention to provide an improved method and apparatus for voltage biasing a bus line.

It is also an object of the present invention to provide a new and useful method and apparatus for voltage biasing a bus line.

It is another object of the present invention to provide a method and apparatus for voltage biasing a bus line with a programmable biasing voltage.

It is further an object of the present invention to provide an improved method and apparatus for transferring data across a differential data line.

It is also an object of the present invention to provide a new and useful method and apparatus for transferring data across a differential data line.

It is yet another object of the present invention to provide a method and apparatus for transferring data across a differential data line that enables transfer of data with symmetrical currents that drive symmetrical differential voltages on the differential data line.

It is further an object of the present invention to provide an improved method and apparatus for controlling a bus and terminating at least one bus line of the bus.

It is also an object of the present invention to provide a new and useful method and apparatus for controlling a bus and terminating at least one bus line of the bus.

It is yet a further object of the present invention to provide a method and apparatus for controlling a bus and terminating at least one bus line of the bus with an integrated circuit chip in a cost effective manner.

The above and other objects, features, and advantages of the present invention will become apparent from the following description and the attached drawings.

DETAILED DESCRIPTION OF A PREFERRED EMBODIMENT

Figure 1:
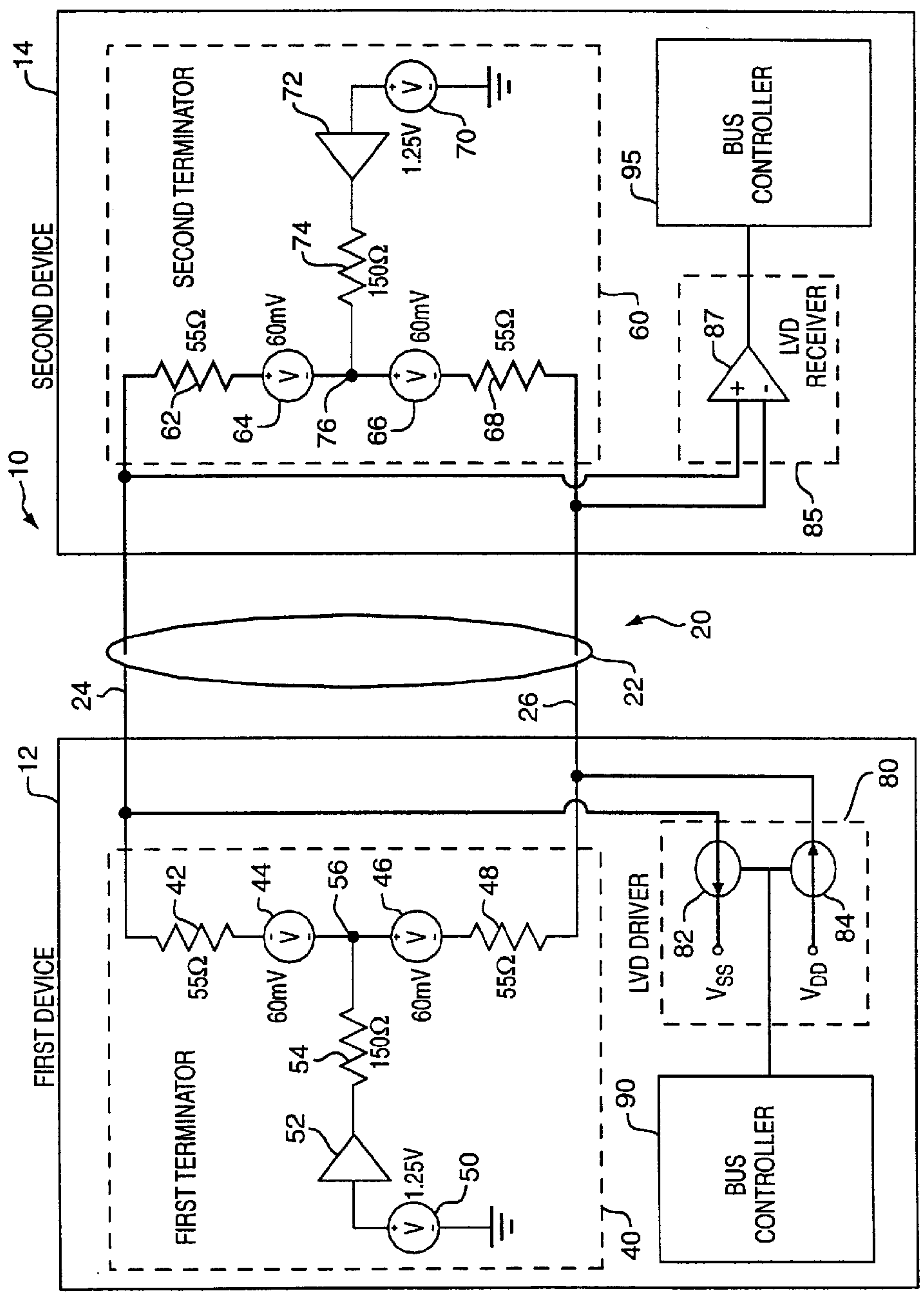
FIG. 1 shows a schematic diagram of a known SCSI bus configuration.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a simplified schematic diagram of a known low voltage differential (LVD) SCSI bus configuration 10. The known LVD SCSI bus configuration 10 includes a first SCSI device 12, a second SCSI device 14, and a SCSI bus 20 that couples the first SCSI device 12 to the second SCSI device 14. The first SCSI device 12 and the second SCSI device 14 may be computer systems, network servers, printers, hard drives, CD-ROM drives, RAID devices, or any other peripheral device having a LVD SCSI interface. The SCSI bus 20 provides a communications path between the first device 12, the second device 14, and any other SCSI device that may be coupled to the SCSI bus 20. To this end, the SCSI bus 20 includes several control lines and data lines that are utilized for transferring data between devices coupled to the SCSI bus 20. Typically, each data line of the SCSI bus 20 is typically terminated and controlled in a similar manner. Therefore, in order to simplify FIG. 1, only a single differential data line 22 that includes a first bus line 24 and a second bus line 26 is depicted in FIG. 1. It should be noted that the SCSI bus 20 actually has several differential data lines that are terminated and controlled in the following described manner.

The first device 12 is coupled to a first end of the SCSI bus 20 and as depicted includes a first terminator 40, a LVD driver 80, and a bus controller circuit 90. The second device is coupled to a second end of the SCSI bus 20 and as depicted includes a second terminator 60, a LVD receiver 85, and a bus controller circuit 95. It should be noted that each LVD SCSI device coupled to the SCSI bus 20 has a LVD driver in order to transmit data and a LVD receiver in order to receive data. However, since only one terminator is coupled to each end of the SCSI bus 20, the SCSI devices that are not coupled to the ends of the SCSI bus need not include a terminator. Furthermore, even the SCSI devices at the ends of the SCSI bus 20 need not include a terminator since a separate terminating device may be coupled to the ends of the SCSI bus 20.

The first terminator 40 is coupled to a first end of the differential data line 22. The first terminator 40 terminates the first end of the differential data line 22 in order to reduce signal reflection upon the differential data line 22. Furthermore, the first terminator 40 impresses a first differential biasing voltage on the first end of the differential data line 22. To this end, the first terminator 40 includes a first resistor 42, a first voltage source 44, a second voltage source 46, a second resistor 48, a third voltage source 50, a buffer 52, and a third resistor 54. The first resistor 42, the first voltage source 44, the second voltage source 46, and the second resistor 48 are respectively coupled in series between the first bus line 24 and the second bus line 26. Furthermore, the third voltage source 50, the buffer 52, and the third resistor 54 are respectively coupled in series between ground and a node 56 that is between the first voltage source 44 and the second voltage source 46.

The first resistor 42 and the second resistor 48 in combination match the impedance of the first bus line 24 and the second bus line 26 of the differential data line 22. In LVD SCSI, the first bus line 24 and the second bus line 26 each typically have a characteristic impedance of approximately 110 ohms. Therefore, in order to match the characteristic impedance of the first and second bus lines 24 and 26, the first resistor 42 and the second resistor 48 have in combination an impedance of approximately 110 ohms. Typically, the first resistor 42 and the second resistor 48 have substantially equal impedances of about 55 ohms apiece.

The buffer 52 helps isolate the third voltage source 50 from the remainder of the first terminator 40 and may be implemented as a voltage follower circuit. In particular, the buffer 52 substantially prevents differential current from flowing through the third resistor 54. As a result of substantially no differential current flowing through the third resistor 54, the voltage level at the node 56 is substantially equal to a third voltage produced by the third voltage source 50. Due to the node 56 being substantially equal to the third voltage produced by the third voltage source 50, the third voltage source 50 essentially sets the center voltage around which differential voltages are applied to the differential data line 22. For LVD SCSI, a typical third voltage produced by the third voltage source 50 is approximately 1.25 volts.

Assuming substantially no differential current is flowing through the first resistor 42 and the second resistor 48, the first voltage source 44 and the second voltage source 46 in combination impress the first differential biasing voltage upon the differential data line 22. In particular, the first voltage source 44 impresses a first voltage upon the first bus line 24 that is greater than the center voltage at node 56. Conversely, the second voltage source 46 impresses a second voltage upon the second bus line 26 that is less than the center voltage at node 56. The difference between the first voltage on the first bus line 24 and the second voltage on the second bus line 26 is the first differential biasing voltage supplied by the first terminator 40. In LVD SCSI, the first voltage source 44 and the second voltage source 46 are typically each 60 millivolts that in combination impress a first differential biasing voltage upon the differential data line 22 of about 120 millivolts.

The bus controller circuit 90 is coupled to the LVD driver 80. The bus controller circuit 90 is operable to generate control signals which cause the LVD 10 driver 80 to transmit data across the differential data line 22. Furthermore, the bus controller circuit 90 is further operable to generate SCSI protocol control signals for transmission across the control lines of the SCSI bus 20 and to receive SCSI protocol control signals from the control lines of the SCSI bus 20. The bus controller circuit 90 is also operable to control an interface between the SCSI bus 20 and the first device 12. For example, if the first device 12 is a computer system, then the bus controller circuit 90 is operable to control transfer of data between the SCSI bus 20 and the computer system in which the bus controller circuit 90 resides. Likewise, if the first device 12 is a hard drive, then the bus controller circuit 90 is configured to control transfer of data between the SCSI bus cable 20 and the hard drive in which the bus controller circuit 90 resides. It should be noted that the bus controller circuit 90 may be further operable to process output signals from a LVD receiver (not shown) of the first device 12.

The LVD driver 80 drives the differential data line 22 of the SCSI bus 20 in order to transfer data across the differential data line 22. In particular, the LVD driver 80 (i) drives the differential data line 22 to a first differential voltage in order to transfer a binary one across the differential data line 22, (ii) drives the differential data line 22 to a second differential voltage in order to transfer a binary zero across the differential data line 22, and (iii) allows the first voltage sources 44 and 64 and the second voltage sources 46 and 66 of the first and second terminators 40 and 60 to drive the differential data line 22 to their respective differential biasing voltages in order to transfer no data across the differential data line 22. Furthermore, the LVD driver 80 is implemented to draw substantially no current from the differential data line 22 during periods when the LVD driver 80 is not driving the differential data line 22. To this end, the LVD driver 80 includes a first current driver 82 that is coupled to the first bus line 24 of the differential data line 22 and a second current driver 84 that is coupled to the second bus line 26 of the differential data line 22. The first current driver 82 and the second current driver 84 in response to control signals received from the bus controller circuit 90 generate and source currents upon said differential data line 22 that cause appropriate differential voltages to be impressed upon the differential data line 22.

The second terminator 60 is coupled to a second end of the differential data line 22. The second terminator 60 terminates the second end of the differential data line 22 in order to reduce signal reflection upon the differential data line 22. Furthermore, the second terminator 60 impresses a second differential biasing voltage on the second end of the differential data line 22. To this end, the second terminator 60 includes a first resistor 62, a first voltage source 64, a second voltage source 66, a second resistor 68, a third voltage source 70, a buffer 72, and a third resistor 74. The first resistor 62, the first voltage source 64, the second voltage source 66, and the second resistor 68 are respectively coupled in series between the first bus line 24 and the second bus line 26. Furthermore, the third voltage source 70, the buffer 72, and the third resistor 74 are respectively coupled in series between ground and a node 76 that is between the first voltage source 64 and the second voltage source 66.

The first resistor 62 and the second resistor 68 in combination match the impedance of the first bus line 24 and the second bus line 26 of the differential data line 22. In LVD SCSI, the first bus line 24 and the second bus line 26 each typically have a characteristic impedance of approximately 110 ohms. Therefore, in order to match the characteristic impedance of the first and second bus lines 24 and 26, the first resistor 62 and the second resistor 68 have in combination an impedance of approximately 110 ohms. Typically, the first resistor 62 and the second resistor 68 have substantially equal impedances of about 55 ohms apiece.

The buffer 72 helps isolate the third voltage source 70 from the remainder of the second terminator 60 and may be implemented as a voltage follower circuit. In particular, the buffer 72 substantially prevents differential current from flowing through the third resistor 74. As a result of substantially no differential current flowing through the third resistor 74, the voltage level at the node 76 is substantially equal to a third voltage produced by the third voltage source 70. Due to the node 76 being substantially equal to the third voltage produced by the third voltage source 70, the third voltage source 70 essentially sets the center voltage around which differential voltages are applied to the differential data line 22. For LVD SCSI, a typical third voltage produced by the third voltage source 50 is approximately 1.25 volts.

Assuming substantially no differential current is flowing through the first resistor 62 and the second resistor 68, the first voltage source 64 and the second voltage source 66 in combination impress the first differential biasing voltage upon the differential data line 22. In particular, the first voltage source 64 impresses a first voltage upon the first bus line 24 that is greater than the center voltage at node 76. Conversely, the second voltage source 66 impresses a second voltage upon the second bus line 26 that is less than the center voltage at node 76. The difference between the first voltage on the first bus line 24 and the second voltage on the second bus line 26 is the second differential biasing voltage supplied by the second terminator 60. In LVD SCSI, the first voltage source 64 and the second voltage source 66 are typically each 60 millivolts that in combination impress a second differential biasing voltage upon the differential data line 22 of about 120 millivolts.

The bus controller circuit 95 is coupled to the LVD receiver 85. The bus controller circuit 95 is operable to process output signals received from the LVD receiver 85. Furthermore, the bus controller circuit 95 is further operable to generate SCSI protocol control signals for transmission across the control lines of the SCSI bus 20 and to receive SCSI protocol control signals from the control lines of the SCSI bus 20. The bus controller circuit 95 is also operable to control an interface between the SCSI bus 20 and the second device 14. For example, if the second device 14 is a computer system, then the bus controller circuit 95 is operable to control transfer of data between the SCSI bus 20 and the computer system in which the bus controller circuit 95 resides. Likewise, if the second device 14 is a hard drive, then the bus controller circuit 95 is configured to control transfer of data between the SCSI bus 20 and the hard drive in which the bus controller circuit 95 resides. It should be noted that the bus controller circuit 95 may be further operable to generate control signals which cause an LVD driver (not shown) of the second device 14 to transmit data across the differential data line 22.

The LVD receiver 85 is coupled to the differential data line 22 of the SCSI bus 20. In general, the LVD receiver 85 is operable to generate an output signal that is representative of a differential voltage impressed on the differential data line 22. To this end, the LVD receiver 85 may be implemented as a differential amplifier 87 that includes a first input that is coupled to the first bus line 24 and a second input that is coupled to the second bus line 26. The differential amplifier 87 is then operable to generate an output signal that is representative of the voltage difference between the first bus line 24 and the second bus line 26. In particular, the differential amplifier 97 is operable to (i) generate an output signal having a low voltage (e.g. a $V_{SS}$ of 0 volts) when a −400 millivolt difference exists between the first bus line 24 and the second bus line 26, and (ii) a high voltage (e.g. a $V_{DD}$ of 3.3 volts) when a +400 millivolt difference exists between the first bus line 24 and the second bus line 26. Furthermore, the LVD receiver 85 draws substantially no current from the differential data line 22.

In operation, each differential data line of the SCSI bus 20 has three states: (1) an idle or quiescent state, (2) an asserted state, and (3) a negated state. In order to simplify the following discussion, it will be assumed that the components of the first and second terminators 40 and 60 are substantially matched. In particular, it will be assumed that (i) the first and second resistors 42, 48, 62, and 68 are each equal to 55 ohms; (ii) the first and second voltage sources 44, 46, 54 and 64 are each equal to 60 millivolts; (iii) the third voltage sources 50 and 70 are each equal to 1.25 volts; and (iv) the third resistors 54 and 74 are each equal to 150 ohms.

During the idle state, no SCSI device drives the differential data line 22. In particular, the bus controller circuit 90 via a control signal causes the LVD driver 80 to drive no current on the differential data line 22. Furthermore, since the LVD receiver 85 draws substantially no current, any current generated through the differential data line 22 would be due to the first and second terminators 40 and 60. However, since the first terminator 40 and the second terminator 60 have substantially matched components, the first terminator 40 and the second terminator 60 will both impress substantially equal voltages upon the first bus line 24 and the second bus line 26 during the idle state. As a result, substantially no current flows through the first bus line 24 and the second bus line 26. Furthermore, as stated above, substantially no differential current flows through the third resistors 54 and 74. According, substantially no current flows in the SCSI bus configuration 10 and the third voltage sources 50 and 70 will respectively impress a center voltage of 1.25 volts on the nodes 56 and 76. The first voltage sources 44 and 64 will each then raise the center voltage at nodes 56 and 76 and impress 1.31 volts (1.25 volts+60 millivolts) on the ends of the first bus line 24. Conversely, the second voltage sources 46 and 66 will lower the center voltage at nodes 56 and 76 and impress 1.19 volts (1.25 volts−60 millivolts) on the ends of the second bus line 26. As a result of the above, a differential biasing voltage of 120 millivolts (1.31 volts−1.19 volts) is impressed upon the differential data line 22. In response to the 120 millivolt differential biasing voltage, the LVD receiver 85 generates an output signal that is representative of the 120 millivolt differential biasing voltage. The bus controller circuit 95 then determines from this output signal that no data is being transferred.

During the asserted state, the LVD driver 80 causes a first differential voltage to be impressed on the differential data line 22. To this end, the bus controller circuit 90 via a control signal causes the LVD driver 80 to sink a 9 milliamp current from the first bus line 24 and to source a 9 milliamp current on the second bus line 26. Furthermore, since the LVD receiver 85 draws substantially no current from the differential data line 22, the current produced by the LVD driver 80 flows solely through the first and second terminators 40 and 60. Moreover, since the first terminator 40 and the second terminator 60 have substantially matched components, the first terminator 40 and the second terminator 60 will have substantially matched impedances, thus causing half of the sourced current (4.5 milliamps) to flow from the LVD driver 80 to the first terminator 40 and half of the sourced current (4.5 milliamps) to flow from the LVD driver 80 through the second terminator 60. Likewise, half of the sinked current (4.5 milliamps) flows from the first terminator 40 to the LVD driver 80 and half of the sinked current (4.5 milliamps) flows from the second terminator 60 to the LVD driver 80.

As stated above, substantially no differential current flows through the third resistors 54 and 74. According, the third voltage sources 50 and 70 respectively impress a center voltage of 1.25 volts on the nodes 56 and 76, and the LVD driver 80 causes a 4.5 milliamp current to flow through each of the first and a second resistors 42, 48, 62, and 68. The first voltage sources 44 and 64 each raise the center voltage at nodes 56 and 76; however, since the 4.5 milliamp current is flowing from the second bus line 26 to the first bus line 24, the voltages generated by the first resistors 42 and 62 have polarities that are opposite of the polarities of the first voltage sources 44 and 64. Accordingly, the first voltage sources 44 and 64 hinder the LVD driver 80 in impressing the first differential voltage on the differential data line 22. In particular, the voltage generated across the first resistors 42 and 62 lower the center voltage by 247.5 millivolts (4.5 milliamps×55 ohms) while the first voltage sources counteract the effect by 60 millivolts, thus resulting in a first voltage of 1.0625 (1.25 volts−247.5 millivolts+60 millivolts) being impressed on the first bus line 24. Conversely, the voltage generated across the second resistors 48 and 68 raise the center voltage by 247.5 millivolts (4.5 milliamps×55 ohms) while the second voltage sources 46 and 66 counteract the effect by 60 millivolts, thus resulting in a second voltage of 1.4375 volts (1.25 volts+247.5 millivolts−60 millivolts) being impressed on the second bus line 26. As a result of the above, a first differential voltage of −375 millivolts (1.0625 volt−1.4375 volts) is impressed upon the differential data line 22. In response to the −375 millivolt differential voltage, the LVD receiver 85 generates an output signal that is representative of the −375 millivolt differential voltage. The bus controller circuit 95 then determines from this output signal that a binary one is being transferred on the differential data line 22.

During the negated state, the LVD driver 80 causes a second differential voltage to be impressed on the differential data line 22. To this end, the bus controller circuit 90 via a control signal causes the LVD driver 80 to source a 4.5 milliamp current on the first bus line 24 and to sink a 4.5 milliamp current from the second bus line 26. Furthermore, since the LVD receiver 85 draws substantially no current from the differential data line 22, the current produced by the LVD driver 80 flows solely through the first and second terminators 40 and 60. Moreover, since the first terminator 40 and the second terminator 60 have substantially matched components, the first terminator 40 and the second terminator 60 have substantially matched impedances, thus causing half of the sourced current (2.25 milliamps) to flow from the LVD driver 80 to the first terminator 40 and half of the sourced current (2.25 milliamps) to flow from the LVD driver 80 to the second terminator 60. Likewise, half of the sinked current (2.25 milliamps) flows from the first terminator 40 to the LVD driver 80 and half of the sinked current (2.25 milliamps) flows from the second terminator 60 to the LVD driver 80.

As stated above, substantially no differential current flows through the third resistors 54 and 74. According, the third voltage sources 50 and 70 respectively impress a center voltage of 1.25 volts on the nodes 56 and 76, and the LVD driver 80 causes a 2.25 milliamp current to flow through each of the first and the second resistors 42, 48, 62, and 68. The first voltage sources 44 and 64 each raise the center voltage at nodes 56 and 76. Furthermore, since the 2.25 milliamp current flows from the first bus line 24 to the second bus line 26, the voltages generated across the first resistors 42 and 62 have polarities that are equal to the polarities of the first voltage sources 44 and 64. Accordingly, the first voltage sources 44 and 64 aid the LVD driver 80 in impressing the second differential voltage on the differential data line 22. In particular, the voltage generated across the first resistors 42 and 62 will raise the center voltage by 123.75 millivolts (2.25 milliamps×55 ohms), and the first voltage sources will aid the effect by 60 millivolts, thus resulting in a first voltage of 1.43375 volts (1.25 volts+123.75 millivolts+60 millivolts) impressed on the first bus line 24. Conversely, the voltage generated across the second resistors 48 and 68 lowers the center voltage by 123.75 millivolts (2.25 milliamps×55 ohms), and the second voltage sources 46 and 66 aid the effect by 60 millivolts, thus resulting in a second voltage of 1.06625 volts (1.25 volts−123.75 millivolts−60 millivolts) being impressed on the second bus line 26. As a result of the above, a second differential voltage of 367.5 millivolts (1.43375 volts−1.06625 volts) is impressed upon the differential data line 22. In response to the 367.5 millivolt differential voltage, the LVD receiver 85 generates an output signal that is representative of the 367.5 millivolt differential voltage. The bus controller circuit 95 then determines from this output signal that a binary zero is being transferred on the differential data line 22.

The above known LVD SCSI bus configuration 10 has several drawbacks. The main drawbacks are due to the fixed differential biasing voltage supplied by the first and second voltage sources 44, 46, 64, and 66. As can be seen from the above description, the known LVD driver 80 was required to supply asymmetrical currents to the differential data line 22 in order to generate the substantially symmetrical differential voltages of the asserted and negated states. What is meant herein by asymmetric currents is two currents that have substantially different magnitudes and opposite polarities. For example, the above LVD driver 80 applied a first current of −9.0 milliamps to the first bus line 24 during the asserted state but applied a second current of +4.5 milliamps to the first bus line 24 during the negated state. The first current and the second current had substantially different magnitudes (9.0 and 4.5 milliamps respectively) and opposite polarities (negative and positive polarity respectively). What is meant herein by symmetrical differential voltages are two differential voltages that have substantially equal magnitudes and opposite polarities. For example, the above LVD driver 80 caused a first differential voltage of −375 millivolts to be impressed on the differential data line 22 during the asserted state, and caused a second differential voltage of +367.5 millivolts to be impressed on the differential data line 22 during the negated state. The first differential voltage and the second differential voltage had substantially equal magnitudes (375 and 367.5 millivolts respectively) and opposite polarities (negative and positive polarities respectively). The asymmetrical current required of the above LVD driver 80 generated additional noise on the differential data line 22. This additional noise prevented reliable transfer of data at rates above 100 Megabytes/second.

In order to provide meaning to the terms "substantially equal magnitudes" and "substantially different magnitudes," it should be appreciated that if a first magnitude is more than 20 percent different than a second magnitude then the first magnitude is substantially different than the second magnitude. For example, if X/Y=2.0000, then X and Y have substantially different magnitudes. Moreover, if a first magnitude is less than 20 percent different than a second magnitude then the first magnitude is substantially equal to the second magnitude. For example, if X/Y=1.0204, then X and Y have substantially equal magnitudes.

A further drawback of the known LVD SCSI configuration 10 is that the fixed differential biasing voltage supplied by the first and second voltage sources 44, 46, 64, and 66 swamped out or masked differential data signals on the differential data line 22. As can be seen from the above discussion, the first differential voltage generated during the asserted state must overcome the differential biasing voltage generated by the first and second voltage sources 44, 46, 64, and 66. However, due to cable attenuation especially at high frequencies such as 100 MHz, the first differential signal may fail to sufficiently overcome the differential biasing voltage. As a result, the LVD receiver 85 may fail to receive the transmitted binary one associated with the asserted state. Likewise, due to the cable attenuation, the second differential voltage generated during the negated state may fail to add sufficiently to the differential biasing voltage. As a result, the LVD receiver 85 may fail to receive the transmitted binary zero associated with the negated state.

Yet another drawback of the known LVD SCSI configuration 10 is that the first and second terminators 40 and 60 must be highly matched in order to impress substantially equal differential biasing voltages to each end of the differential data line 22. If the differential biasing voltage applied to each end of the differential data line by the first terminator 40 and the second terminator 60 were not substantially matched, then loop current flowed through the differential data line 22. The loop current if large enough could cause changes to the differential voltages on the differential data line 22 which may be misinterpreted as data by the LVD receiver 85. In order to reduce loop currents, costly manufacturing processes were used to match the components of the first and second terminators 40 and 60. For example, it was common practice to utilize thin film resistors for the first and second resistors 42, 48, 62, and 68 and to individually laser trim each resistor in order to match the resistors. It should be appreciated that this process was labor intensive and very costly.

As a result, there is a need for a LVD SCSI bus configuration that allows the LVD driver to generate symmetrical currents to produce symmetrical differential voltages in order to reduce noise on the differential data line. There is also a need for a LVD SCSI bus configuration that does not swamp out the differential data signals at high transfer rates.

Furthermore, there is a need for a LVD SCSI bus configuration that reduces loop currents without requiring costly manufacturing processes.

Figure 2:
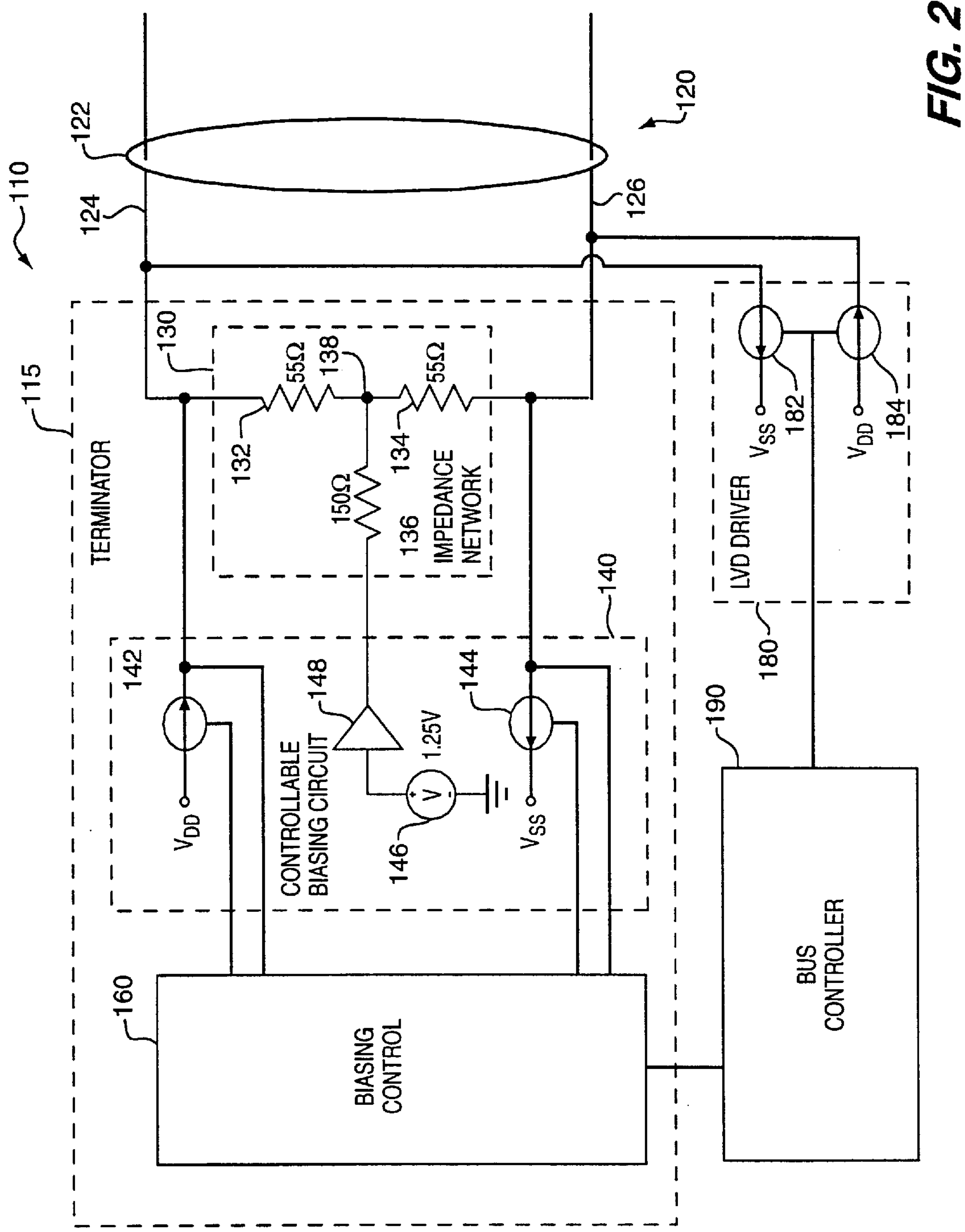
FIG. 2 shows a schematic diagram of a SCSI bus configuration that incorporates various features of the present invention therein.

Shown in FIG. 2 is a LVD SCSI bus configuration 110 which incorporates therein features of the present invention which address the above needs. The LVD SCSI bus configuration 110 includes a LVD terminator 115, a SCSI bus 120, a LVD driver 180, and a bus controller circuit 190. The SCSI bus 120 includes several control lines and data lines that are utilized for transferring data between devices coupled to the SCSI bus 120. In order to simplify FIG. 2, only a single differential data line 122 that includes a first bus line 124 and a second bus line 126 is depicted in FIG. 2. It should be noted that the SCSI bus 120 actually has several differential data lines that are terminated and controlled in the following described manner.

The LVD terminator 115 terminates a first end of the differential data line 122 and impresses a differential biasing voltage upon the first end of the differential data line 122. To this end, the LVD terminator 115 includes an impedance network 130, a controllable biasing circuit 140, and a biasing control circuit 160. The impedance network 130 is coupled to the first end of the differential data line 122. The impedance network 130 terminates the first end of the differential data line 122 in order to reduce signal reflection upon the differential data line 122. To this end, the impedance network 130 includes a first resistor 132, a second resistor 134, and a third resistor 136. The first resistor 132, and the second resistor 134 are coupled in series between the first bus line 124 and the second bus line 126. Furthermore, the third resistor 136 having an impedance of approximately 150 ohms is coupled between the controllable biasing circuit 140 and a node 138 that is between the first resistor 132 and the second resistor 134. The first resistor 132 and the second resistor 134 in combination match the impedance of the first bus line 124 and the second bus line 126 of the differential data line 122. In LVD SCSI, the first bus line 124 and the second bus line 126 each typically have a characteristic impedance of approximately 110 ohms. Therefore, in order to match the characteristic impedance of the first and second bus lines 124 and 126, the first resistor 132 and the second resistor 134 each have an impedance of about 55 ohms which in combination provide an impedance of approximately 110 ohms to the differential data line 122.

The controllable biasing circuit 140 is coupled between the impedance network 130 and the biasing control circuit 160. The controllable biasing circuit 140 impresses a differential biasing voltage on the first end of the differential data line 122. In particular, the controllable biasing circuit 140 impresses a differential biasing voltage having a differential voltage level that is based upon control signals received from the biasing control circuit 160. To this end, the controllable biasing circuit 140 includes a first controllable current source 142, a second controllable current source 144, a first voltage source 146, and a buffer 148. The first controllable current source 142 is coupled to the first bus line 124. The first controllable current source is operable to produce a first current that has a first current level that is based on a first biasing control signal received from the biasing control circuit 160. Likewise, the second controllable current source 144 is coupled to the second bus line 126 and is operable to produce a second current that has a second current level that is based on a second biasing control signal received from the biasing control circuit 160. The first and second current sources 142 and 144 in combination cause a current to flow through the first and second resistor 132 and 134 that is based on the first and second biasing control signals received from the biasing control circuit 160. The current through the first and second resistors 132 and 134 generates a differential biasing voltage that is impressed upon the differential data line 122.

Moreover, the buffer 148 couples the first voltage source 146 to the third resistor 136 of the impedance network 130. The buffer 148 helps isolate the first voltage source 146 from the impedance network 130 and may be implemented as a voltage follower circuit. In particular, the buffer 148 substantially prevents differential current from flowing through the third resistor 136. As a result of substantially no differential current flowing through the third resistor 136, the voltage level at the node 138 is substantially equal to a first voltage produced by the first voltage source 146. Due to the node 138 being substantially equal to the first voltage produced by the first voltage source 146, the first voltage source 146 essentially sets the center voltage around which differential voltages are applied to the differential data line 122. In a preferred embodiment, the first voltage source 146 produces a first voltage of approximately 1.25 volts.

Figure 3:
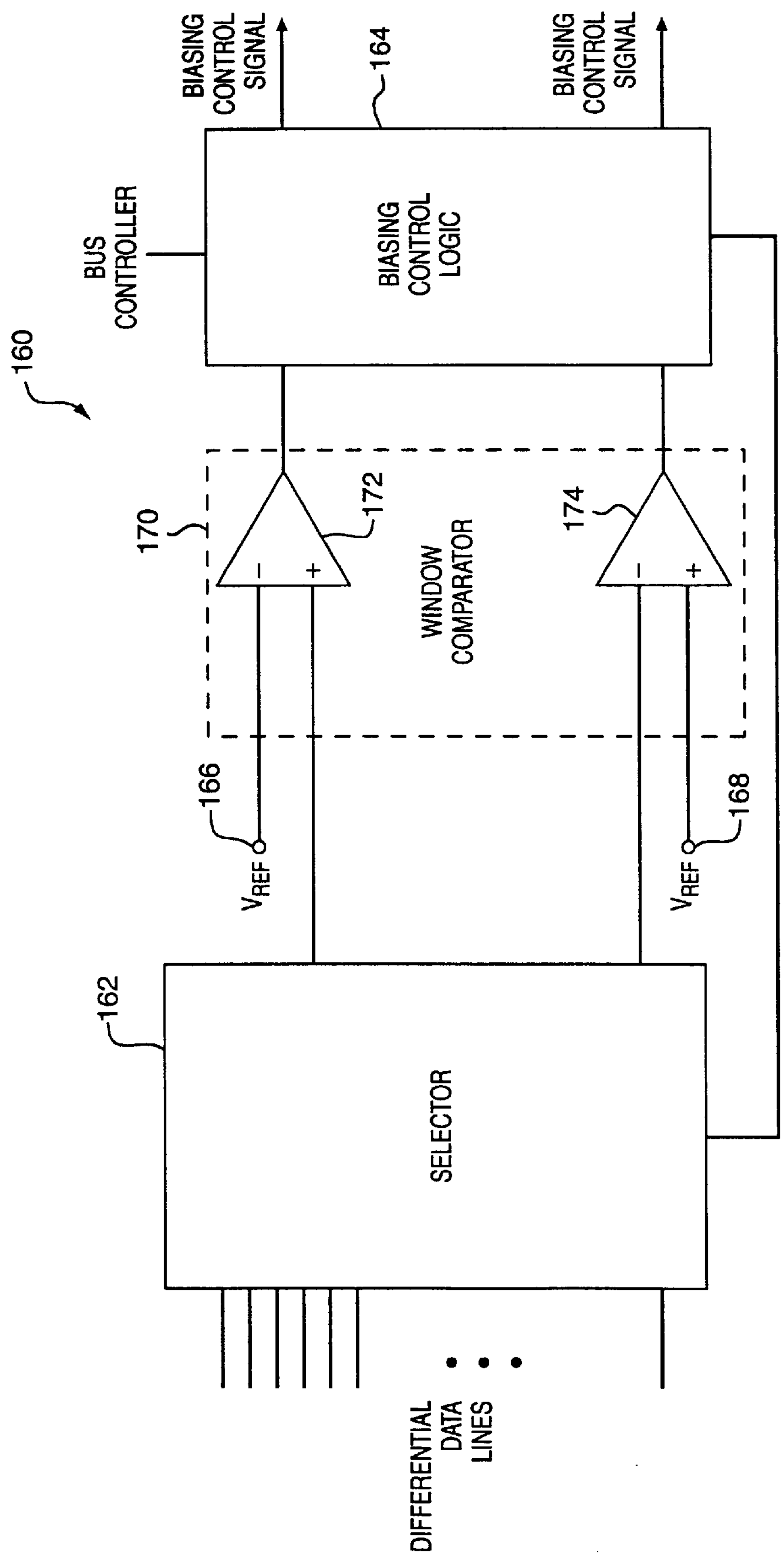
FIG. 3 shows a schematic diagram of the biasing control circuit of FIG. 2.

The biasing control circuit 160 is coupled to the first controllable current source 142, the second controllable current source 144, the first bus line 124, the second bus line 126, and the bus controller circuit 190. In general, the biasing control circuit 160 is operable to control the first controllable current source 142, and the second controllable current source 144. To this end, as shown in FIG. 3, the biasing control circuit 160 includes a selector 162, biasing control logic 164, a first reference voltage source 166, a second reference voltage source 168, and a window comparator 170. The selector 162 is coupled to the first bus line 124, the second bus line 126, the biasing control logic 164, and the window comparator 170. As stated above, the SCSI bus 120 includes several differential data lines. The selector 162 is coupled to each of these differential data lines. The selector 162 includes several switches that in response to a selection signal received from the biasing control logic 164 enable the selector 162 to selectively couple the bus lines of a single differential data line to the window comparator 170. While the biasing control circuit 160 could be implemented to have a separate window comparator 170 for each differential data line 122, the use of the selector 162 with the single window comparator 170 greatly reduces the cost of the biasing control circuit 160. This is especially true in wide LVD SCSI where the SCSI bus has 16 differential data lines and 2 differential parity lines that would each require a separate window comparator.

The first reference voltage source 166 is coupled to the window comparator 170 and is operable to generate a first reference voltage. Similarly, the second reference voltage source 168 is coupled to the window comparator 170 and is operable to generate a second reference voltage. The first reference voltage produced by the first reference voltage source 166 is substantially equal to a first desired voltage for the first bus line 124 during the idle state. Similarly, the second reference voltage produced by the second reference voltage source 168 is substantially equal to second desired voltage for the second bus line 126 during the idle state. In a preferred embodiment, the first and second reference voltage sources 166 and 168 are implemented with known band gap circuitry. Furthermore, the first reference voltage source 166 is implemented to generate 1.31 volts for the first reference voltage, and the second reference voltage source 168 is implemented to generate 1.19 volts for the second reference voltage.

The window comparator 170 is coupled to the selector 162, the first reference voltage source 166, and the second reference voltage source 168. In order to simplify the following discussion, it is assumed that the selector 162 has coupled the first bus line 124 and the second bus line 126 to the window comparator 170. The window comparator 170 is operable to compare a first voltage of the first bus line 124 to the first reference voltage and to generate a first status signal that is indicative of whether the first voltage satisfies a predetermined relationship to the first reference voltage. The window comparator 170 is also operable to compare a second voltage of the second bus line 126 to the second reference voltage and to generate a second status signal that is indicative of whether the second voltage satisfies a predetermined relationship to the second reference voltage.

To this end, the window comparator 170 includes a first comparator 172 and a second comparator 174. A first input of the first comparator 172 is coupled to the first reference voltage source 166 and a second input of the first comparator 172 is coupled to the first bus line 124 via the selector 162. Similarly, a first input of the second comparator 174 is coupled to the second reference voltage source 168 and a second input of the second comparator 174 is coupled to the second bus line 126 via the selector 162. The first comparator 172 is configured to (i) generate a high output (e.g. a $V_{DD}$ of 3.3 volts) for the first status signal if the first voltage of the first bus line 124 is less than the first reference voltage of the first reference voltage source 166, and (ii) generate a low output (e.g. a $V_{SS}$ of 0 volts) for the first status signal if the first voltage of the first bus line 124 is not less than the first reference voltage of the first reference voltage source 166. Conversely, the second comparator 174 is configured to (i) generate a high voltage (e.g. a $V_{DD}$ of 3.3 volts) for the second status signal if the second voltage of the second bus line 126 is greater than the second reference voltage of the second reference voltage source 168, and (ii) generate a low voltage (e.g. 0 volts) for the second status signal if the second voltage of the second bus line 126 is not greater than the second reference voltage of the second reference voltage source 168. In the preferred embodiment, the first and second comparator 172 and 174 are each implemented in a known manner with differential amplifier circuitry.

The biasing control logic 164 is coupled to the first controllable current source 142, the second controllable current source 144, the window comparator 170, and the bus controller circuit 180. The biasing control logic 164 is generally configured to (i) receive signals from the window comparator 170 and the bus controller circuit 180, and (ii) generate from the received signals, appropriate first and second biasing control signals for the first the second controllable current source 142 and 144, respectively.

Referring back to FIG. 2, the LVD driver 180 drives the differential data line 122 of the SCSI bus 120 in order to transfer data across the differential data line 122. In particular, the LVD driver 180 (i) drives the differential data line 122 to a first differential voltage in order to transfer a binary one across the differential data line 122, (ii) drives the differential data line 122 to a second differential voltage in order to transfer a binary zero across the differential data line 122, and (iii) allows the controllable biasing circuit 140 to drive the differential data line 122 to the proper differential biasing voltage in order to transfer no data across the differential data line 122. Furthermore, the LVD driver 180 draws substantially no current from the differential data line 122 during period when the LVD driver 180 is not driving the differential data line 122. To this end, the LVD driver 180 includes a first current driver 182 that is coupled to the first bus line 124 of the differential data line 122 and a second current driver 184 that is coupled to the second bus line 126 of the differential data line 122. The first current driver 182 and the second current driver 184 in response to control signals received from the bus controller circuit 190 generate and source currents upon said differential data line 122 that cause appropriate differential voltages to be impressed upon the differential data line 122.

The bus controller circuit 190 is coupled to the LVD driver 180. The bus controller circuit 190 is operable to generate control signals which cause the LVD driver 180 to transmit data across the differential data line 122. Furthermore, the bus controller circuit 190 is further operable to generate SCSI protocol control signals for transmission across the control lines of the SCSI bus 120 and to receive SCSI protocol control signals from the control lines of the SCSI bus 120. The bus controller circuit 190 is also operable to control an interface between the SCSI bus 120 and the device in which the bus controller circuit 190 resides. For example, if bus controller circuit 190 is within a computer system, then the bus controller circuit 190 is operable to control transfer of data between the SCSI bus 120 and the computer system. Likewise, if bus controller circuit 190 is within a hard drive, then the bus controller circuit 190 is configured to control transfer of data between the SCSI bus 120 and the hard drive. Furthermore, the bus controller circuit 190 is further operable to determine that data transfer is about to begin on the differential data line 122 and to transmit to the biasing control circuit 160 a control signal that indicates data transfer is to begin on the differential data line 122. It should be noted that the bus controller circuit 190 may be further operable to process output signals from a LVD receiver (not shown).

It should be noted that each end of the SCSI bus 120 needs to be terminated in order for proper operation. Furthermore, it should also be noted that since both ends of the SCSI bus 120 in the preferred embodiment are terminated in a similar manner only one end of the SCSI bus 120 is illustrated in FIG. 2.

Figure 4:
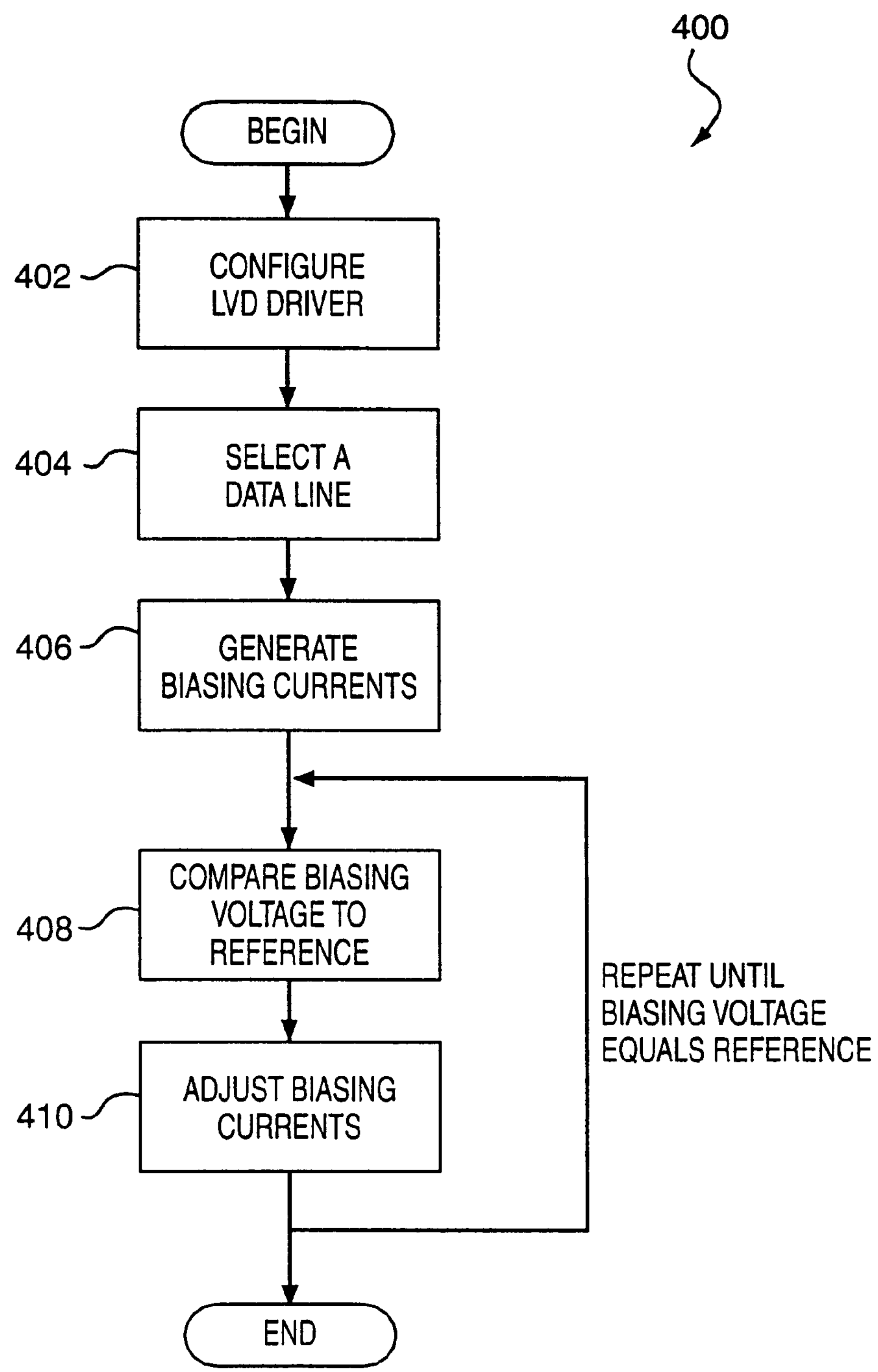
FIG. 4 shows a flowchart of an initialization procedure utilized by the SCSI bus configuration of FIG. 2.

Prior to operation of the SCSI bus 120, the SCSI bus configuration 110 goes through an initialization procedure 400 which is depicted in FIG. 4. The initialization procedure 400 essentially programs the first and second controllable current sources 142 and 144. The initialization procedure 400 begins in step 402 with the bus controller circuit generating a first control signal that causes the LVD driver 190 not to drive the differential data line 122. The biasing control circuit 160 then in step 404 generates a selection signal that causes the selector 162 to couple the first bus line 124 and the second bus line 126 to the window comparator 170. Then in step 406, the biasing control circuit 160 generates a first biasing control signal and a second biasing control signal. In particular, the biasing circuit 160 generates the first biasing control signal to cause the first controllable current source 144 to produce a first current that is less than the current required to generate the appropriate differential biasing voltage. Likewise, the biasing circuit 160 generates the second biasing control signal to cause the second controllable current source 144 to produce a second current that is less than the current required to generate the appropriate differential biasing voltage. The first current and second current flow through the first and second resistors 132 and 134 thus causing a first voltage to be impressed upon the first bus line 124 and a second voltage to be impressed upon the second bus line 126. It should be noted that substantially no differential current flows through the third resistor 150 due to the buffer 148. As a result, the first voltage source 146 substantial impresses its 1.25 volt voltage upon the node 138, thus creating a center voltage around which differential voltages are impressed upon the differential data line 122.

The window comparator 170 in step 408 generates a first and a second status signal. The first status signal indicates whether the first voltage on the first bus line has a predetermined relationship to the first reference voltage of the first reference voltage source 166, and the second status signal indicates whether the second voltage on the second bus line 126 has a predetermined relationship to the second reference voltage of the second reference voltage source 168. In particular, the window comparator 170 generates (i) a high output (e.g. a $V_{DD}$ of 3.3 volts) for the first status signal if the first voltage on the first bus line 124 is less than a first reference voltage of 1.31 volts, and (ii) a low output (e.g. a $V_{SS}$ of 0 volts) for the first status signal if the first voltage on the first bus line 124 is not less than the first reference voltage of 1.31 volts. Furthermore, the window comparator 170 generates (i) a high voltage signal (e.g. a $V_{DD}$ of 3.3 volts) for the second status signal if the second voltage on the second bus line 126 is greater than the second reference voltage of 1.19 volts, and (ii) a low voltage signal (e.g. a $V_{SS}$ of 0 volts) for the first status signal if the first voltage on the second bus line 126 is not greater than the second reference voltage of 1.19 volts.

The biasing control logic 164 then adjusts the currents generated by the first and second controllable current sources 142 and 144 dependent upon the first and second status signals. In particular,412 causes the first logic 164 in step 412 causes the first controllable current source 142 to increase its current if the first status signal has a high voltage level. To this end, the biasing control logic 164 generates a new first biasing control signal that will cause the first controllable current source 142 to increase the magnitude of its current. Likewise, the biasing control logic in step 414 causes the second controllable current source 144 to increase its current if the first status signal has a high voltage level. To this end, the biasing control logic 164 generates a new second biasing control signal that will cause the second controllable current source 144 to increase the magnitude of its current. Increasing the magnitude of the first current produced by the first controllable current source 142 increases the magnitude of the first voltage on the first bus line 124. Similarly, increasing the magnitude of the second current produced by the second controllable current source 144 increases the magnitude of the second voltage on the second bus line 126.

The procedure then returns to step 408 in order for the window comparator 170 to determine whether the first voltage on the first bus line 124 and the second voltage on the second bus line 126 need to be further adjusted. The procedure 400 continues to adjust the first and second currents of the first and second controllable current sources 142 and 144 until a differential voltage substantially equal to 120 millivolts (1.31 volts−1.19 volts) centered around 1.25 volts is developed between the first bus line and the second bus line. It should be noted that the initialization procedure 400 in the preferred embodiment is applied to each of the differential data lines of the SCSI bus 120. Furthermore, it should be noted that while the initialization procedure 400 may be utilized each time the differential biasing voltage needs to be developed between the first and second bus lines 124 and 126, in the preferred embodiment the first and second controllable current sources 142 and 144 are programmed to generate the appropriate first and second currents in response to biasing control signals from the biasing control circuit 160.

Like the prior art SCSI bus configuration 10 of FIG. 1, each differential data line of the SCSI bus 120 may be in one of three states during operation: (1) an idle or quiescent state, (2) an asserted state, and (3) a negated state. During the idle state, no SCSI device drives the differential data line 122 and the controllable bias circuit 140 impresses a differential biasing voltage upon the differential data line 122. To this end, the bus controller 190 via a control signal causes the LVD driver 180 to drive no current on the differential data line 122 and the biasing control circuit 160 generates first and second biasing control signals that cause the first and second controllable current sources 142 and 144 to generate currents through the first and the second resistors 132 and 134. In particular, the biasing control circuit 160 generates a first biasing control signal and a second biasing control signal that cause the first and second controllable current sources 142 and 144 to generate currents having magnitudes equal to those obtained from the initialization procedure 400. As a result, the first and second controllable current sources 142 and 144 generate current through the first and second resistors 132 and 134 that cause a differential biasing voltage of 120 millivolts to be impressed upon the differential data line 122.

During the asserted state, the LVD driver 180 causes a first differential voltage to be impressed on the differential data line 122. To this end, the biasing control circuit 160 in response to a signal received from the bus controller 190 generates first and second biasing control signals that cause the first and second controllable current sources 142 and 144 to generate substantially no current. Furthermore, the bus controller circuit 90 via a control signal causes the LVD driver 190 to sink a 7.2 milliamp current from the first bus line 124 and to source a 7.2 milliamp current on the second bus line 126. It should be noted that without laser trimming, thin film resistors may be cost effectively manufactured having impedances maintained within ±15% of the desired impedance level. Accordingly, a second terminator (not shown) coupled to the other end (not shown) of the SCSI bus 120 will have a characteristic impedance relatively close to the characteristic impedance of the first terminator 115. Therefore, substantially half of the sourced current (3.6 milliamps) flows from the LVD driver 180 to the first terminator 115 and half of the sourced current (3.6 milliamps) flows from the LVD driver 180 to the second terminator. Likewise, half of the sinked current (3.6 milliamps) flows from the first terminator 115 to the LVD driver 180 and half of the sinked current (3.6 milliamps) flows from the second terminator to the LVD driver 180.

As stated above, substantially no differential current flows through the third resistor 136. Accordingly, the first voltage source 146 respectively impresses a center voltage of 1.25 volts on the node 138, and the LVD driver 180 causes a 3.6 milliamp current to flow through each of the first and the second resistors 132 and 134. Since a 3.6 milliamp current is flowing from the second bus line 126 to the first bus line 124, the voltage generated across the first resistor 132 lowers the center voltage by 198 millivolts (3.6 milliamps×55 ohms), thus resulting in a first voltage of 1.052 (1.25 volts−198 millivolts) being impressed on the first bus line 124. Conversely, the voltage generated across the second resistor 134 raise the center voltage by 198 millivolts (3.6 milliamps×55 ohms), thus resulting in a second voltage of 1.448 volts (1.25 volts+198 millivolts) being impressed on the second bus line 126. As a result of the above, a first differential voltage of −396 millivolts (1.052 volts−1.448 volts) is impressed upon the differential data line 122. In response to the −396 millivolt differential voltage, a LVD receiver (not shown) generates an output signal that is representative of the −396 millivolt differential voltage. A bus controller circuit then determines from this output signal that a binary one is being transferred on the differential data line 122.

During the negated state, the LVD driver 180 causes a second differential voltage to be impressed on the differential data line 122. To this end, the biasing control circuit 160 in response to a signal received from the bus controller 190 generates first and second biasing control signals that cause the first and second controllable current sources 142 and 144 to generate substantially no current. Furthermore, the bus controller 190 via a control signal causes the LVD driver 190 to source a 7.2 milliamp current on the first bus line 124 and to sink a 7.2 milliamp current from the second bus line 126. It should be noted that without laser trimming, thin film resistors may be cost effectively manufactured having impedances maintained within ±15% of the desired impedance level. Accordingly, a second terminator (not shown) coupled to the other end (not shown) of the SCSI bus 120 will have a characteristic impedance relatively close to the characteristic impedance of the first terminator 115. Therefore, substantially half of the sourced current (3.6 milliamps) flows from the LVD driver 180 to the first terminator 115 and half of the sourced current (3.6 milliamps) flows from the LVD driver 180 to the second terminator. Likewise, half of the sinked current (3.6 milliamps) flows from the first terminator 115 to the LVD driver 180 and half of the sinked current (3.6 milliamps) flows from the second terminator to the LVD driver 180.

As stated above, substantially no differential current flows through the third resistor 136. Accordingly, the first voltage source 146 respectively impresses a center voltage of 1.25 volts on the node 138, and the LVD driver 180 causes a 3.6 milliamp current to flow through each of the first and the second resistors 132 and 134. Since a 3.6 milliamp current is flowing from the first bus line 124 to the second bus line 126, the voltage generated across the first resistor 132 raises the center voltage by 198 millivolts (3.6 milliamps×55 ohms), thus resulting in a first voltage of 1.448 (1.25 volts+198 millivolts) being impressed on the first bus line 124. Conversely, the voltage generated across the second resistor 134 lowers the center voltage by 198 millivolts (3.6 milliamps ×55 ohms), thus resulting in a second voltage of 1.052 volts (1.25 volts−198 millivolts) being impressed on the second bus line 126. As a result of the above, a first differential voltage of +396 millivolts (1.448 volts−1.052 volts) is impressed upon the differential data line 122. In response to the +396 millivolt differential voltage, a LVD receiver (not shown) generates an output signal that is representative of the +396 millivolt differential voltage. A bus controller circuit then determines from this output signal that a binary zero is being transferred on the differential data line 122.

As can be seen from the above description, the LVD driver 180 of the present invention was able to utilize substantially symmetrical currents in order generate the substantially symmetrical differential voltages of the asserted and negated states. What is meant herein by symmetrical currents is two currents that have substantially equal magnitudes and opposite polarities. For example, the above LVD driver 180 applied a first current of −7.2 milliamps to the first bus line 24 during the asserted state and applied a second current of +7.2 milliamps to the first bus line 24 during the negated state. The first current and the second current had substantially equal magnitudes (7.2 and 7.2 milliamps respectively) and opposite polarities (negative and positive polarity respectively). What is meant herein by symmetrical differential voltages are two differential voltages that have substantially equal magnitudes and opposite polarities. For example, the above LVD driver 180 caused a first differential voltage of −396 millivolts to be impressed on the differential data line 122 during the asserted state, and caused a second differential voltage of +396 millivolts to be impressed on the differential data line 122 during the negated state. The first differential voltage and the second differential voltage had substantially equal magnitudes (396 and 396 millivolts respectively) and opposite polarities (negative and positive polarities respectively). It should be noted while the above examples illustrated exactly symmetrical currents producing exactly symmetrical voltages, due to variances in components, in practice the symmetrical currents will have slightly different magnitudes and the symmetrical differential voltages will have slightly different magnitudes. As a result, the above were described as being substantially symmetrical.

As can be seen from the above description, the SCSI bus configuration 110 of the present invention resolves the problems associated with asymmetrical current driving. By removing the differential biasing voltage prior to data transfer, the LVD driver 180 may generate substantially symmetrical currents in order to generate substantially symmetrical differential voltages for the asserted and negated states. As a result of this symmetrical current driving, the SCSI bus configuration 110 enables data transfer at higher rates due to reducing the noise associated with asymmetrical current driving. It should also be noted that by removing the differential biasing voltage during data transfer the SCSI bus configuration 110 of the present invention addresses the problems associated with the differential biasing voltage swamping out the differential data signals during high transfer rates.

Furthermore, as may be seen from the above discussion, the SCSI bus configuration 110 of the present invention enables terminators at each end of the bus to provide substantially matched differential biasing voltages without costly laser trimming of resistors. In particular, the controllable biasing circuit 140 allows for programmable adjustment of the differential biasing voltage supplied by the terminator. This programmable adjustment reduces the manufacturing cost of the LVD terminators because the components of the LVD terminators need not be so tightly matched since the differential biasing voltage provided by the LVD terminator may later be programmed. Furthermore, it should be noted that this programmable adjustment also helps reduce loop currents that may be misinterpreted as data transfer.

Figure 5:
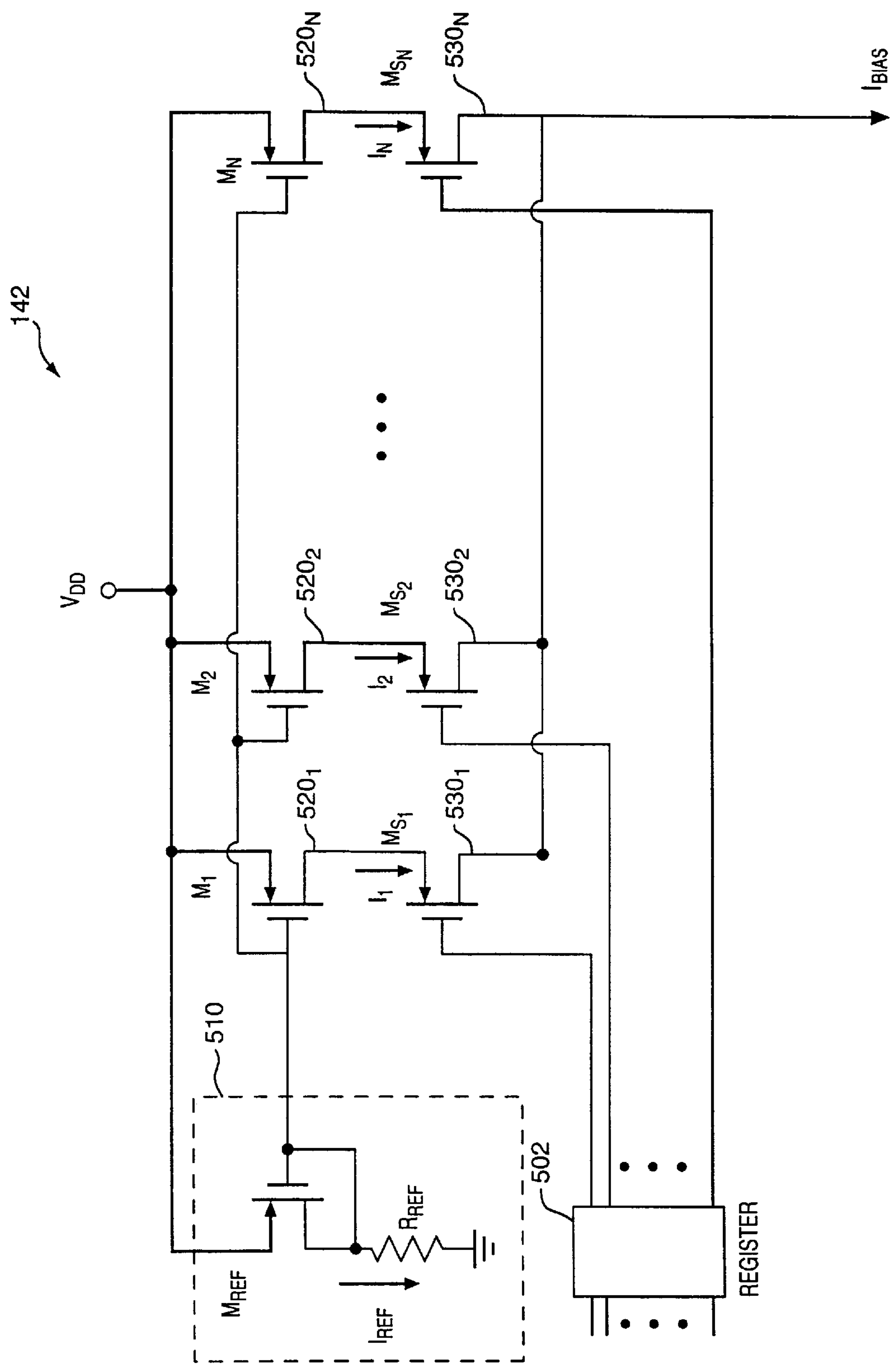
FIG. 5 shows a schematic diagram of the first controllable current source of FIG. 2.

Shown in FIG. 5 is a schematic diagram of a preferred embodiment for the first controllable current source 142. The first controllable current source 142 includes a control register 502, a reference current source 510, mirrored current sources 520$_1$, 520$_2$, . . . 520$_N$, and switches 530$_1$, 530$_2$, . . . 530$_N$. The reference current source 510 includes a reference P-channel metal oxide semiconductor field effect transistor (MOSFET) $M_{REF}$ and a reference resistor $R_{REF}$. The reference resistor $R_{REF}$ couples the gate and the drain of the reference MOSFET $M_{REF}$ to a low voltage source $V_{SS}$ such as ground. Furthermore, the source of the reference MOSFET $M_{REF}$ is coupled to a high voltage source $V_{DD}$ such as 3.3 volts. The reference resistor $R_{REF}$ controls the magnitude of the reference current $I_{REF}$ which flows through the reference MOSFET $M_{REF}$. In particular, the greater the resistance of the reference resistor $R_{REF}$ the smaller the magnitude of the reference current $I_{REF}$. The exact resistance of the reference resistor $R_{REF}$ will be dependent upon the electrical characteristics of the reference MOSFET $M_{REF}$ and the desired magnitude of the reference current $I_{REF}$. In the preferred embodiment, the resistance the reference resistor $R_{REF}$ is set such that the reference current $I_{REF}$ is substantially equal to 100 microamps.

Each mirrored current source 520$_1$, 520$_2$, . . . 520$_N$ is operable to generate a current that is substantially equal to the reference current $I_{REF}$ produced by the reference current source 510. To this end, each mirrored current source 520$_1$, 520$_2$, . . . 520$_N$ includes a single P-channel MOSFET $M_1$, $M_2$, . . . $M_N$ respectively. Each gate of the MOSFETs $M_1$, $M_2$, . . . $M_N$ is coupled to the gate of the reference MOSFET $M_{REF}$. Furthermore, each source of the MOSFETs $M_1$, $M_2$, . . . $M_N$ is coupled to the high voltage source $V_{DD}$. Furthermore, each MOSFET $M_1$, $M_2$, . . . $M_N$ are matched devices that have electrical characteristics substantially equal to the electrical characteristics of the reference MOSFET $M_{REF}$. As a result of the above interconnections and matched characteristics, each of the MOSFETs $M_1$, $M_2$, . . . $M_N$ generates a current $I_1$, $I_2$, . . . $I_N$ that is substantially equal to $I_{REF}$. Since in the preferred embodiment $I_{REF}$ is equal to 100 microamps, each of the MOSFETs $M_1$, $M_2$, . . . $M_N$ generates a current $I_1$, $I_2$, . . . $I_N$ that is substantially equal to 100 microamps.

Each switch 530$_1$, 530$_2$, . . . 530$_N$ is operable to couple its respective mirrored current source 520$_1$, 520$_2$, . . . 520$_N$ to the output $I_{BIAS}$ based upon the status of a control signal received from the control register 502. To this end, each switch 530$_1$, 530$_2$, . . . 530$_N$ includes a single P-channel MOSFET $M_{S_1}$, $M_{S_2}$, . . . $M_{S_N}$, respectively. Each source of the MOSFETs $M_{S_1}$, $M_{S_2}$, . . . $M_{S_N}$ is coupled to a respective gate of the MOSFETs $M_1$, $M_2$, . . . $M_N$ and each gate of the MOSFETs $MS_1$, $M_{S_2}$, . . . $M_{S_N}$ is coupled to a respective output of the control register 502. Furthermore, each drain of the MOSFETs $M_{S_1}$, $M_{S_2}$, . . . $M_{S_N}$ is coupled to the output $I_{BIAS}$ of the first controllable current source 142. Due to this interconnection scheme, if the control register 502 provides a switch 530$_X$ with a low voltage level (e.g. a $V_{SS}$ of 0 volts), then the switch 530$_X$ will couple its respective mirrored current source 520$_X$ to the output $I_{BIAS}$. However, if the control register 502 provides the switch 530$_X$ with a high voltage level (e.g. a $V_{DD}$ of 3.3 volts), then the switch 530$_X$ will decouple its respective mirrored current source 520$_X$ from the output $I_{BIAS}$.

The control register 502 is coupled to the switches 530$_1$, 530$_2$, . . . 530$_N$ and to the biasing control circuit 160. The control register 502 is operable to receive a first biasing control signal from the biasing control circuit 160 and to provide the switches 530$_1$, 530$_2$, . . . 530$_N$ with control signals. In one embodiment, the control register 502 receives and stores a first biasing control signal that is representative of a binary string. The control register 502 then activates the switches 530$_1$, 530$_2$, . . . 530$_N$ corresponding to 1's in the binary string and deactivates the switches 530$_1$, 5302, . . . 530$_N$ corresponding to 0's in the binary string.

In another embodiment, the control register 502 is implemented with a counter. In this embodiment, the control register 502 receives a first biasing control signal from the biasing control circuit 160 that indicates either to increment or decrement the counter. The control register 502 then activates or deactivates switches 530$_1$, 530$_2$, . . . 530$_N$ in order to have a number of activated switches 530$_1$, 530$_2$, . . . 530$_N$ equal to the value stored in the counter. It should be noted by activating and deactivating switches 530$_1$, 530$_2$, . . . 530$_N$, the control register 502 is able to control the amount of current produced by the first controllable current source 142. For example, assuming that each mirrored current source 520$_1$, 520$_2$, . . . 520$_N$ produces 100 microamps, the control register may activate switches 530$_1$ . . . 530$_5$ in order to produce a 500 microamp current. Therefore, if the first controllable current source 142 has sixteen switches and sixteen mirrored current sources producing 100 microamps a piece, then the first controllable current source 142 may generate currents from 0 to 1.6 milliamps with a 100 microamp resolution.

It should be noted that generating mirrored currents that are a power of two larger than the reference current is relatively easy and inexpensive to implement in integrated circuit manufacturing. As a result, in another embodiment of the present invention each of the mirrored current sources 520$_1$, 520$_2$, . . . 520$_N$ generates a current $I_1$, $I_2$, . . . $I_N$ that is a power of two larger than the reference current $I_{REF}$ For example, assuming that $I_{REF}$ is equal to 100 microamps and that the first controllable current source 142 includes four switches 530$_1$ . . . 530$_4$ and four mirrored current sources 520$_1$ . . . 520$_4$, then the first mirrored current source 520$_1$ produces 100 microamps ($2^0 \times I_{REF}$), the second mirrored current source 520$_2$ produces 200 microamps ($2^1 \times I_{REF}$), the third mirrored current source 520$_3$ produces 400 microamps ($2^2 \times I_{REF}$), and the fourth mirrored current source 520$_4$ produces 800 microamps ($2^4 \times I_{REF}$). As a result of this configuration, the first controllable current source is capable of generating a biasing current $I_{BIAS}$ from 0 to 1.5 milliamps with a 100 microamp resolution. For example, the control register 502 could activate the second switch 530$_2$ and the fourth switch 530$_4$ in order to produce a biasing current $I_{BIAS}$ of 1.0 milliamps.

Figure 6:
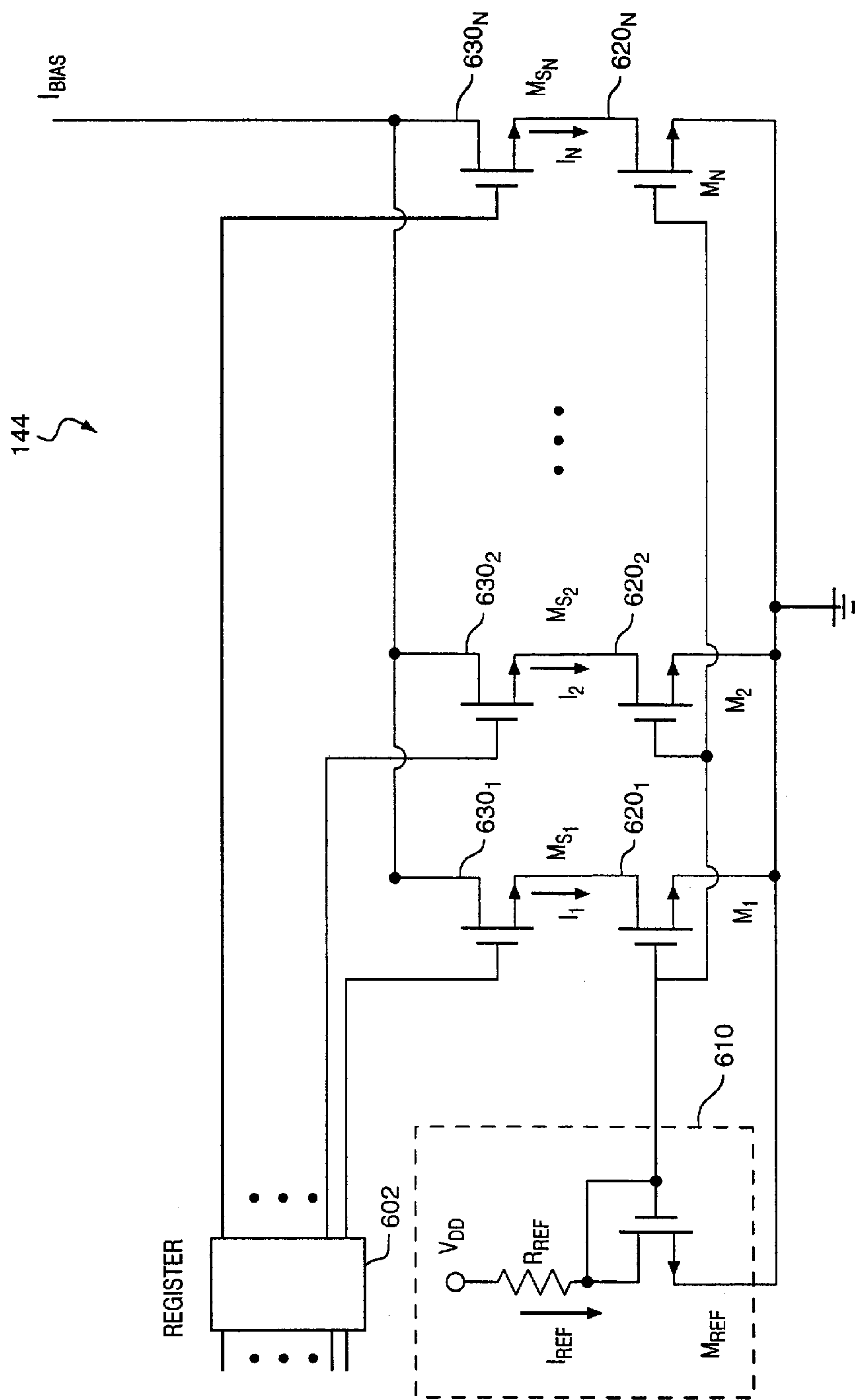
FIG. 6 shows a schematic diagram of the second controllable current source of FIG. 2.

Shown in FIG. 6 is a schematic diagram of a preferred embodiment for the second controllable current source 144. The second controllable current source 144 includes a control register 602, a reference current source 610, mirrored current sources 620$_1$, 620$_2$, . . . 620$_N$, and switches 630$_1$, 630$_2$, . . . 630$_N$. The operation and structure of the second controllable current source 144 is nearly identical to the operation and structure of the first controllable current source 142. The main difference is that the P-channel MOSFETs of the first controllable current source 142 are replaced with N-channel MOSFETs in the second controllable current source 144. Furthermore, the low voltage source and the high voltage source connections of the first controllable current source 142 are swapped in the second controllable current source 144. Since the structure and operation of the second controllable current source 144 would be understood by one skilled in the art from the above description of the first controllable current source 142 and the FIGS. 5 and 6, the second controllable current source 144 Is not discussed in further detail.

Figure 7:
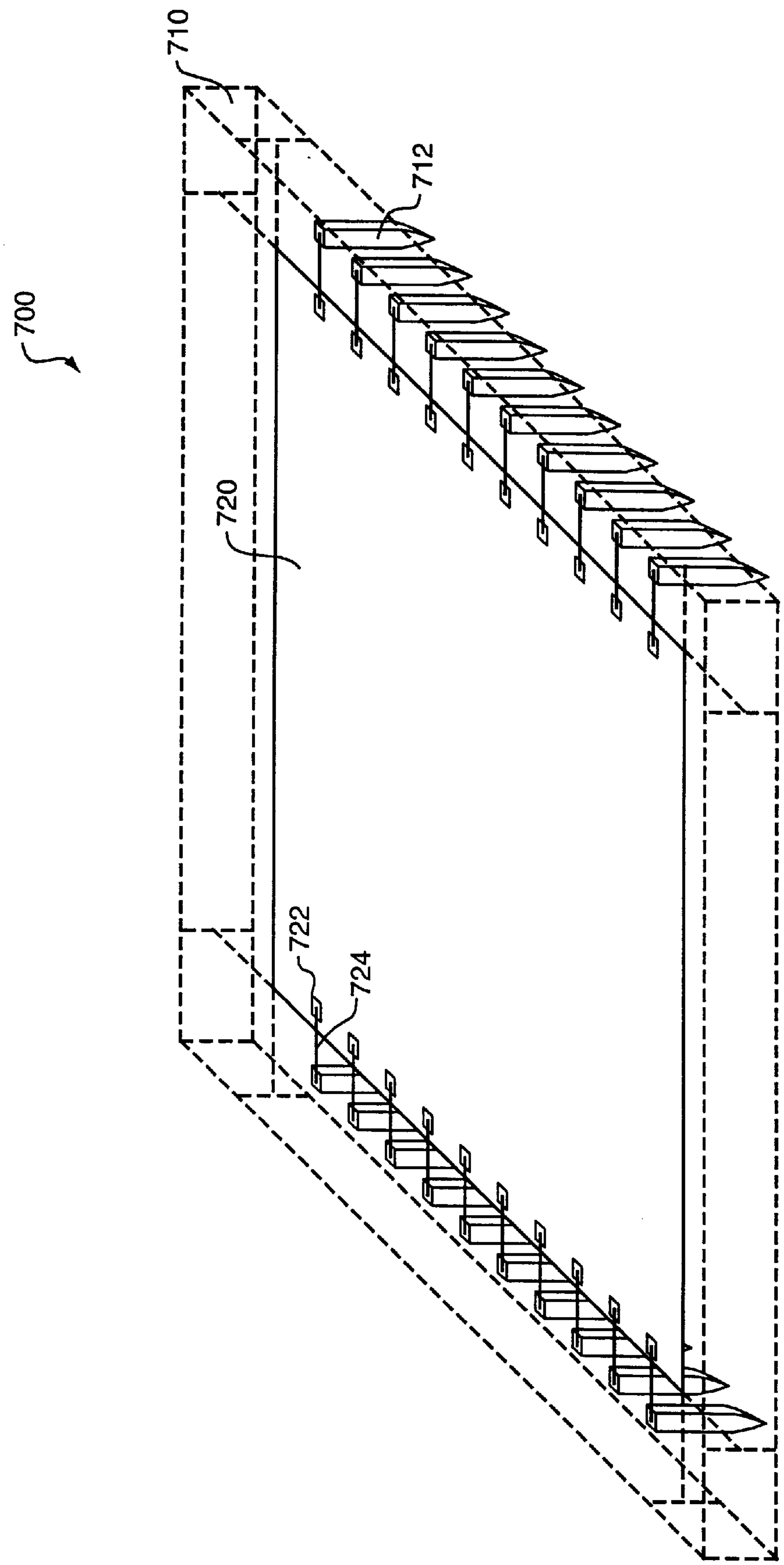
FIG. 7 shows a perspective view of an integrated circuit chip which incorporates the LVD terminator and bus controller of FIG. 2 therein. Note that FIG. 7 shows the substrate 720 located about midway within the integrated circuit chip 700 between an upper insulating portion of package 710 and a lower insulating portion of package 710.

Referring back to FIG. 2, the LVD terminator 115, the LVD driver 180, a LVD receiver (not shown), and the bus controller circuit 190 are implemented in a single integrated circuit chip in a preferred embodiment. In order to clearly define what is meant by a single integrated circuit chip reference is made to FIG. 7. In FIG. 7, a single integrated circuit chip 700 is illustrated. The single integrated circuit chip 700 includes an integrated circuit package 710 and an integrated circuit substrate 720. The package 710 is typically implemented with ceramics or other insulator materials. Furthermore, the package 710 includes terminals or pins 712. The terminals 712 are conductors which provide external contacts for transferring signals into and out of integrated circuit chip 700. Moreover, the package 710 mechanically supports the substrate 720 during operation of the integrated circuit chip 700.

The substrate 720 is a single wafer made of a semiconductor material such as silicon (Si) or gallium arsenate (GaAs). The LVD terminator 115, the LVD driver 180, the LVD receiver, and the bus controller circuit 190 are implemented on the semiconductor using known integrated circuit manufacturing techniques such as doping. The substrate 720 includes input/output (I/O) pads 722 which provide a relatively large (as compared to the size of the transistors doped in the substrate 720) conductor contact to the integrated circuit implemented in the substrate 720. Bonding wires 724 couple the I/O pads 722 to the terminals 712. The combination of the terminals 712, the bonding wires 724, and the I/O pads 722 provide a mechanism for transferring signals to and from the outside of the integrated circuit chip 700 to the LVD terminator 115, the LVD driver 180, the LVD receiver, and the bus controller circuit 190 that are implemented in the substrate 720.

It should be noted that recent integrated circuit chips such as the Pentium Pro processor implemented by Intel, Corporation of Santa Cruz, Calif. have utilized a combination of more than one substrate within a single integrated circuit chip. In these implementations, bonding wires within the integrated circuit chip electrically couple the substrates together within the integrated circuit chip. Thus, it should be appreciated that the substrate 720 of integrated circuit chip 700 may be made up of more than one individual semiconductor wafer. For example, the integrated circuit chip may include a first semiconductor wafer and a second semiconductor wafer which (i) are interconnected by a number of bonding wires, and (ii) are supported by the package 710. In this embodiment, the first semiconductor wafer and the second semiconductor wafer may collectively have the LVD terminator 115, the LVD driver 180, the LVD receiver, and the bus controller circuit 190 fabricated thereon.

Moreover, it should be noted that a single integrated circuit chip is not made up individual circuit components that have been mounted to a circuit board with various wires and traces interconnecting the circuit components. For example, multiple integrated circuit chips which are interconnected by various wires and traces, when take together, do not make up a single integrated circuit chip. Additionally, an integrated circuit chip that is interconnected to discrete components (e.g. resistors and transistors) by various wires and traces do not, when take together, make up a single integrated circuit chip.

Furthermore, it should be noted that the programmability of the biasing voltage of the present invention has enabled the cost effective integration of the LVD terminator and bus controller circuit into a single integrated circuit package. Prior to the present invention, combining the LVD terminator with the bus controller circuit in a single integrated circuit chip was not done due to the high manufacturing costs associated with the prior art LVD terminators. However, the programmability of the biasing voltage of the present invention allows for cheaper manufacturing processes to be used to implement the LVD terminator. As a result, combination of the LVD terminator 115 of the present invention with the bus controller circuit 190 in a single integrate circuit chip provides a fullfeatured and low cost integrated circuit chip that was not achievable from the prior art LVD terminators.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An integrated circuit chip for controlling a bus and terminating at least one bus line of said bus, comprising:

an integrated circuit package having a plurality of terminals for connecting said package to said bus; and an integrated circuit substrate supported by said package, said substrate including a bus controller circuit coupled to said plurality of terminals and a terminating circuit coupled to said at least one bus line of said bus, wherein (i) said bus controller circuit is configured to control transfer of data on said bus, and (ii) said terminating circuit is configured to substantially match a characteristic impedance of said at least one bus line.

2. The integrated circuit chip of claim 1, wherein:

said substrate comprises a single semiconductor wafer upon which said bus controller circuit and said terminating circuit are fabricated.

3. The integrated circuit chip of claim 1, wherein:

said substrate comprises a plurality of semiconductor wafers electrically coupled together, said plurality of semiconductor wafers collectively have said bus controller circuit and said terminating circuit fabricated thereon, and said plurality of semiconductor wafers are supported by said package.

4. The integrated circuit chip of claim 1, wherein:

said terminating circuit includes a resistor having an impedance that is substantially equal to said characteristic impedance of said bus line.

5. An integrated circuit chip for controlling a bus and terminating at least one differential data line of said bus, said at least one differential data line including a first bus line of said bus and a second bus line of said bus, comprising:

an integrated circuit package having a plurality of terminals configured to couple said package to said bus, wherein (i) a first terminal of said plurality of terminals is configured to couple said package to said first bus line, and (ii) a second terminal of said plurality of terminals is configured to couple said package to said second bus line; and an integrated circuit substrate supported by said package, said substrate including a bus controller circuit coupled to said plurality of terminals and a terminating circuit coupled to said first terminal and said second terminal, wherein (i) said bus controller circuit is configured to control transfer of data on said bus, and (ii) said terminating circuit is configured to substantially match a characteristic impedance of said at least one differential data line.

6. The integrated circuit chip of claim 5, wherein:

said substrate comprises a single semiconductor wafer upon which said bus controller circuit and said terminating circuit are fabricated.

7. The integrated circuit chip of claim 5, wherein:

said substrate comprises a plurality of semiconductor wafers electrically coupled together, said plurality of semiconductor wafers collectively have said bus controller circuit and said terminating circuit fabricated thereon, and said plurality of semiconductor wafers are supported by said package.

8. The integrated circuit chip of claim 5, wherein:

said terminating circuit includes a first resistor coupled to said first terminal and a second resistor coupled to said second terminal, and said first resistor and said second resistor in combination has an impedance that is substantially equal to a characteristic impedance of said at least one differential data line.

9. The integrated circuit chip of claim 5, further comprising:

a biasing circuit coupled to said first terminal and said second terminal, said biasing circuit being configured to develop a differential biasing voltage between said first bus line and said second bus line.

10. The integrated circuit chip of claim 5, further comprising:

a controllable biasing circuit coupled to said first terminal and said second terminal, wherein said controllable biasing circuit is configured to (i) develop a first differential biasing voltage between said first bus line and said second bus line in response to a first control signal, and (ii) develop a second differential biasing voltage between said first bus line and said second bus line in response to a second control signal.

11. The integrated circuit chip of claim 10, further comprising:

a biasing control circuit coupled to said first terminal and said second terminal, said biasing control circuit being configured to (i) generate said first control signal, (ii) determine that said first differential biasing voltage has a predetermined relationship to a reference voltage, and (iii) generate said second control signal in response to determining that said first differential biasing voltage has said predetermined relationship to said reference voltage.

12. A method of controlling a bus and terminating at least one bus line of said bus, comprising the steps of:

providing an integrated circuit package which includes a plurality of terminals for connecting said package to said bus, and housing an integrated circuit substrate within said package, said substrate including a bus controller circuit coupled to said plurality of terminals and a terminating circuit coupled to said at least one bus line of said bus;

controlling transfer of data on said bus with said bus controller circuit; and terminating said at least one bus line with said terminating circuit.

13. The method of claim 12, further comprising the step of:

fabricating said bus controller and said terminating circuit upon a single semiconductor wafer.

14. The method of claim 12, further comprising the steps of:

forming said substrate with a plurality of semiconductor wafers electrically coupled together, said plurality of semiconductor wafers collectively have said bus controller circuit and said terminating circuit fabricated thereon, and supporting said plurality of semiconductor wafers by said package.

15. The method of claim 12, further comprising the step of:

including a resistor having an impedance that is substantially equal to said characteristic impedance of said bus line in said terminating circuit.

* * * * *